F. R. BEUHNE.

APPARATUS FOR SEPARATING WAX AND HONEY OF HONEYCOMB.

APPLICATION FILED MAY 29, 1908.

Reissued Jan. 13, 1914. 13,674.

Witnesses

J. Raymond Hoover,

M. L. Pugh

Inventor

Frederick Richard Beuhne

By Chas. J. Williamson,

Attorney

COLUMBIA PLANOGRAPH CO., WASHINGTON, D. C.

UNITED STATES PATENT OFFICE.

FREDERICK R. BEUHNE, OF TOOBORAC, VICTORIA, AUSTRALIA, ASSIGNOR TO THE A. I. ROOT COMPANY, OF MEDINA, OHIO, A CORPORATION.

APPARATUS FOR SEPARATING WAX AND HONEY OF HONEYCOMB.

13,674. Specification of Reissued Letters Patent. Reissued Jan. 13, 1914.

Original No. 877,544, dated January 28, 1908, Serial No. 383,112. Application for reissue filed May 29, 1908. Serial No. 435,850.

*To all whom it may concern:*

Be it known that I, FREDERICK RICHARD BEUHNE, of Tooborac, in the county of Rodney, State of Victoria, and Commonwealth of Australia, have invented a certain new and useful Improvement in Apparatus for Separating Wax and Honey of Honeycomb, of which the following is a specification.

The object of my invention is the convenient and economical separation of wax and honey from honeycombs and the cappings of honeycombs.

Figure 1:
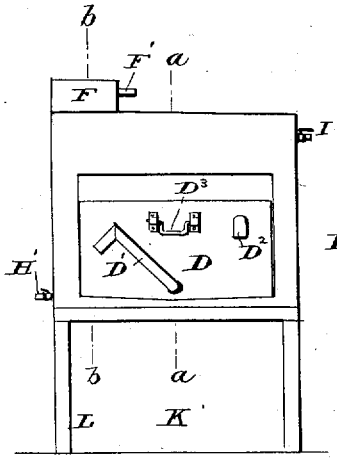
Figure 3:
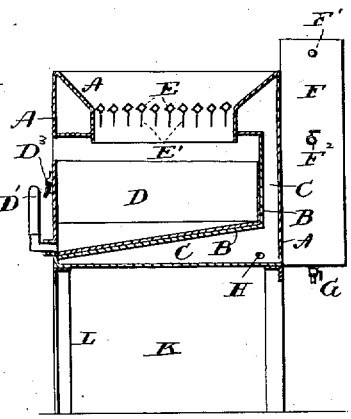
Figure 2:
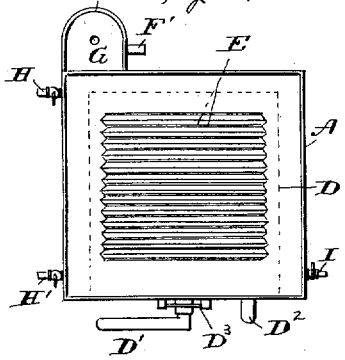
Figure 4:
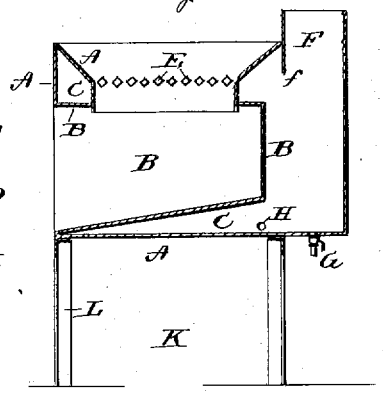
Figure 5:
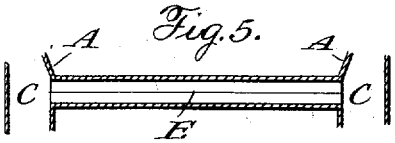

Referring to the accompanying sheet of drawings which form a part of this specification, Figure 1 is a front view of the apparatus, and Fig. 2 a plan view of the same. Fig. 3 is a vertical section taken on line *a—a* of Fig. 1, while Fig. 4 is a vertical section taken through the knife heater on line *b—b* also of Fig. 1. Fig. 5 is a detail view to illustrate the tubes connecting the two jacketed spaces.

Similar letters of reference are used to indicate like parts in the several views.

The said apparatus consists in an outer metal casing A, and an inner metal casing B, secured together as shown in drawing, Fig. 3. The said casings form a jacketed space C, between the two. The inner casing B, is open at its front in order that it may receive a collecting receptacle or tray D, which admits the material after treatment. The two jacketed spaces, on opposite sides of said inner casing, are connected by a series of horizontal transverse tubes E, the upper edges form a grating upon which the material to be operated upon is placed. The said tubes also form a connection between the two said jacketed side spaces, which receive the heated water or steam.

The tubes E may be of square or other suitable section, and are secured in the positions shown in Figs. 2, 3 and 4. While the form of the tubes in cross section may be varied, I nevertheless prefer the square form illustrated in the drawings, with the angles or corners uppermost, for several reasons. Sharp edges are thus presented to the material to be treated, which facilitate its separation into pieces or strips, and the upper surfaces of the tubes have such incline that the melted wax and honey quickly slide therefrom, and in a compact structure I get an extended heating surface. The temperature necessary to melt wax is so high as to be apt to injure honey if it is long exposed to such temperature, and it is therefore desirable to have the contact of the honey with the heated surfaces for as brief a time as possible. Moreover, by having inclined surfaces, the passage of the wax and honey over the heated surfaces is effected wholly by gravity, and the surfaces are self-cleaning, so long as the temperature is high enough to melt the wax. Each of the said tubes is provided on its under side, with a longitudinal projecting rib or vane E′, down which the molten material runs and drops therefrom into the collecting tray D. A receptacle F, with inner wall *f*, is provided at the rear of apparatus for the purpose of heating a long knife which is used for slicing the cappings off the combs. The said knife receptacle is also used for receiving the water required for charging the apparatus. It is furnished with an overflow pipe F′, the tap G being also provided for emptying the said apparatus. The water in said apparatus may be heated by a stove or lamp placed within the space K below the apparatus and within the four angle iron supports L. The water may also be heated by using a steam coil arranged within the apparatus. H represents the steam inlet for said coil, while H′ is the outlet. The water heated by means of the said coil circulates and passing through the tubes E, raises the temperature of said tubes sufficiently high to melt the bees-wax from the cappings and other portions of the combs. To heat the tubes by the use of steam brought from an independent source, the said steam would be admitted at I and released at the tap $F^2$. The inner wall *f*, of knife heating vessel F, terminates at the level of top of inner casing B. The collecting tray D is provided with an elbow discharge outlet D′, through which the honey passes. The said elbow outlet may be adjusted by raising or lowering the outlet end as desired. The said tray is also provided with a handle $D^3$, for the purpose of withdrawal. The apparatus is supported by four angle iron legs marked L.

The manner of working the apparatus shown and described is as follows: Water is supplied to the receptacle F, until it rises to the overflow pipe F′. The tap $F^2$ being closed, a suitable stove or lamp is then placed in the space K, and the water heated to 212° Fahrenheit. The said heated water, or steam arising therefrom, circulates through the spaces C and tubes E, which form the grating upon which the material to be operated upon is placed. The application of heat to the honey combs and cappings causes the wax to melt, which with the released honey and refuse falls between the tubes E, and drops from the ribs or vanes E′, into the receiving tray D. The said tray is provided with two outlets D′ and $D^2$, the former being the elbow discharge for the outflow of honey while the latter is for the discharge of wax. The liquid honey, wax and refuse separate in the said tray, owing to their different specific gravities. The said substances accumulate until they reach the elbow outlet D′, from which the honey commences and continues to flow so long as the melting operations are continued. The liquid wax being of lower specific gravity than the honey and refuse, rises until it reaches and flows from the outlet $D^2$. As the refuse accumulates in the said receiving tray, it displaces the honey, which goes downward and the wax which goes upward until it completely occupies the space between the upper outlet $D^2$ and the lower outlet D′. The said receiving tray is then withdrawn by the handle $D^3$ and emptied, or it may be replaced by a fresh one. By adjusting the outlet pipe D′, to change the level of discharge therefrom, and thus changing the level of the top surface of the refuse, the discharge of refuse with wax can be prevented, and thus wax as well as honey delivered from the apparatus entirely free from refuse, and in a marketable condition without any further treatment. To discharge all the honey from the tray, the outlet end of the honey discharge pipe is lowered by swinging said pipe downward. The heating of the tubes E may also be accomplished by the admission of steam at I, which escapes at $F^2$ when steam is available.

Having thus described my invention, what I claim is—

1. In an apparatus for rendering beeswax and the cappings of honeycomb, the outer metal casing A, in combination with inner casing B, forming the jacketed spaces C, with the transverse tubes E with longitudinal ribs or vanes E′, substantially as herein described and illustrated by the drawings.

2. In an apparatus for rendering beeswax and the cappings of honeycombs, the outer metal casing A, in combination with inner casing B, and receiving tray D together with the outlet for honey D′, and the outlet for wax $D^2$, substantially as herein described and illustrated by the drawings.

3. An apparatus for rendering beeswax comprising an outer casing, an inner casing, a vertical vessel communicating with the space between the two receptacles and having an open top, an overflow pipe near the top of said receptacle and an emptying tap at the bottom thereof.

4. In an apparatus for the separation of wax and honey, the combination of a grating composed of a series of separated tubes, means for supplying a heating medium to the interior of said tubes, and a receiver to which the melted wax and the honey are delivered, said tubes having downwardly inclined side walls.

5. In an apparatus for the separation of wax and honey, the combination of a grating composed of a series of separated tubes, means for supplying a heating medium to the interior of said tubes, and a receiver to which the melted wax and the honey are delivered, said tubes being angular in cross section.

6. In an apparatus for the separation of wax and honey, the combination of a horizontal series of inclined wax and honey receiving surfaces, means for heating such surfaces, comprising a chamber within which the heating medium is contained and to which the honey and wax have no access, and a receiver to which the wax and honey are delivered.

In testimony that I claim the foregoing, I have hereunto set my hand, this 27″ day of May, 1908.

FREDERICK R. BEUHNE.

Witnesses:
CLYDE B. WEIKERT,
CHAS. J. WILLIAMSON.

Copies of this patent may be obtained for five cents each, by addressing the "Commissioner of Patents, Washington, D. C."